United States Patent
Uwabata et al.

(10) Patent No.: US 6,211,918 B1
(45) Date of Patent: Apr. 3, 2001

(54) VIDEO SIGNAL CONVERTER AND TELEVISION SIGNAL PROCESSING APPARATUS

(75) Inventors: Hideyo Uwabata, Takatsuki; Minoru Miyata, Suita, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/900,377

(22) Filed: Jul. 11, 1997

(30) Foreign Application Priority Data

Jul. 11, 1996 (JP) .................................................. 8-181906

(51) Int. Cl.$^7$ .............................. H04N 7/01; H04N 11/20
(52) U.S. Cl. ......................... 348/458; 348/536; 348/554; 348/706; 348/556
(58) Field of Search ................................. 348/441, 458, 348/581, 459, 500, 561, 550, 536, 542, 497, 554, 555, 556, 558, 572, 573, 704, 705, 706; H04N 7/01, 11/20

(56) References Cited

U.S. PATENT DOCUMENTS

| | | | |
|---|---|---|---|
| 4,831,441 | * 5/1989 | Ando | 348/458 |
| 5,455,628 | 10/1995 | Bishop . | |
| 5,504,532 | 4/1996 | Rhodes . | |
| 5,673,086 | * 9/1997 | Fukuoka et al. | 348/445 |
| 5,978,041 | * 11/1999 | Masuda et al. | 348/563 |

FOREIGN PATENT DOCUMENTS

| | | |
|---|---|---|
| 02050596 | 2/1990 | (EP) . |
| 07059054 | 3/1995 | (EP) . |
| 0705034 | 4/1996 | (EP) . |
| 8-9343 | 1/1996 | (JP) . |

OTHER PUBLICATIONS

European Search Report, application no. EP97111854 dated Sep. 24, 1998.

* cited by examiner

Primary Examiner—Michael Lee
(74) Attorney, Agent, or Firm—Ratner & Prestia

(57) ABSTRACT

A video signal converter converts a video signal to a required form. The required form of the signal is the display format for displaying the signal. The input signal is converted to a digital signal and stored in a memory using the output of a first clock pulse generator synchronized to the horizontal synchronizing signal of the input signal. The digital signal is read out from the memory using the output of a second clock pulse generator synchronized to the vertical synchronizing signal of the input signal from a position specified by the controller. The output digital signal is then reconverted to an analog signal.

3 Claims, 5 Drawing Sheets

VIDEO SIGNAL CONVERTER AND TELEVISION SIGNAL PROCESSING APPARATUS

FIELD OF THE INVENTION

The present invention relates to the field of video signal processing and, more particularly, to a video signal converter which converts a signal from personal computers to a television signal.

BACKGROUND OF THE INVENTION

As personal computers (hereafter referred to as PCs) become increasingly popular, there is growing demand for the display of PC signals on larger screens using inexpensive means. In general, multi-scan displays and other exclusive displays are used as video display monitors for displaying PC signals. However, large multi-scan displays and other exclusive displays cost a great deal more because of the advanced technology used in these displays.

On the other hand, high definition television sets (hereafter referred to as HDTVs), which are capable of displaying PC signals, are rapidly penetrating the market. Consequently, demands for displaying PC signals on HDTVs are sharply increasing. However, HDTVs are unable to display PC signals directly. An interface is required to link a PC with an HDTV for displaying PC signals on HDTVs. For example, a video signal converter as disclosed in Japanese Laid-open Patent H8-9343 is required. With the use of this video signal converter, PC signals can be displayed on HDTVs. The video signal converter of the prior art is explained with reference to FIG. 5. FIG. 5 is a block diagram of the video signal converter of the prior art.

In FIG. 5, an input signal processor 51 converts the analog input signal to a digital signal, and separates and outputs the horizontal synchronizing signal (HD1) and vertical synchronizing signal (VD1) of the input signal. The input signal processor 51 also produces a clock pulse (CK1) which is used for converting the input signal to a digital signal.

A compressor 52 condenses the number of picture elements in horizontal and vertical directions in a specified ratio as required, and passes through the signal unmodified when compression is not necessary. A memory 53 provisionally stores data. An expander 54 enlarges the number of picture elements in the horizontal and vertical directions in a specified ratio as required, and passes through the signal unmodified when expansion is not necessary.

An output signal processor 55 conducts necessary signal processing including conversion of the digital signal to an analog signal. A controller 56 outputs a compression or expansion ratio for the horizontal or vertical direction for converting and outputting the input signal in a required form of signal. The required form of the signal is the display format for displaying the signal. The controller 56 also outputs a signal for controlling write and readout of the memory 53. An output HD2/VD2/CK2 generator 57 produces and outputs the output horizontal synchronizing signal (HD2) and output vertical synchronizing signal (VD2) after conversion. The output HD2/VD2/CK2 generator 57 also outputs a clock pulse CK2.

The operation of the video signal converter of the prior art configured as illustrated in FIG. 5 is described below. In order to convert the input signal to a different format, the video signal converter compresses or expands the input signal and then outputs a synchronizing signal in a required form. The video signal converter in FIG. 5 compresses the input signal using the compressor 52 and expands a signal from the memory 53 using the expander 54. Both compression and expansion is performed during digital signal processing.

For example, assume the input signals are of the NTSC system, extended definition television standard (hereafter referred to as EDTV standard), high definition television standard (hereafter referred to as HDTV standard), or PC signals of video graphics array (hereafter referred to as VGA specification). Further, it is assumed that the input signals after conversion are also of the NTSC system, EDTV standard, HDTV standard, or PC signals of VGA specification. Compression and expansion of these signals are determined based on the correlation of the input and output signals. When compression is necessary, the video signal converter of the prior art compresses the signal using the compressor 52 and provisionally stores it in the memory 53. Data are then read out from the memory 53 synchronized with CK2 and are passed through the expander 53 without undergoing expansion processing. When expansion is necessary, the video signal converter of the prior art passes the signal through the compressor 52 without undergoing compression processing, and provisionally stores it in the memory 53. Data are then readout from the memory 53 synchronized with CK2 and are expanded by the expander 53. If the input signal is the PC signal of VGA specification, for example, and the form of signal required after conversion is the HDTV signal, the vertical frequency of the input signal is 60 Hz and that of the output signal is 59.94 Hz. The difference in the vertical frequency between the input and output signals is converted by controlling write and readout of the memory 53.

As described above, the video signal converter of the prior art conducts all compression and expansion processes during digital signal processing. Therefore, in order to compress and expand the input signal without any deterioration, it is necessary to provide a sufficient number of taps in compression and expansion filters so that signals are regenerated without distortion due to conversion of the sampling frequency. To satisfy this requirement, a very large-scale circuit is necessary. Moreover, if the input signal is the PC signal of VGA specification and the signal required after conversion is the HDTV signal, the vertical frequency of the input signal is 60 Hz and the vertical frequency of the output signal is 59.94 Hz. To convert between these two frequencies the video signal converter of the prior art uses a large-scale digital circuit for interpolation or the control of write and readout of the memory 53. Consequently, deterioration in picture quality due to interpolation or missing images may occur.

SUMMARY OF THE INVENTION

The present invention converts an analog video signal to a digital signal using a first clock pulse synchronized to the horizontal synchronizing signal and stores the digital signal in a memory. A second clock pulse synchronized to the vertical synchronizing signal of the input signal is employed for reading out the video signal stored in the memory. The video signal is read out from the memory within a period controlled by a controller. The digital signal retrieved from the memory is reconverted to an analog signal. The controller may prohibit reading out the signal from the memory. During this time a blank signal not including the video signal is output as an analog signal. Thus, the PC output signal is converted from an analog to digital signal, and the digital data is stored in the memory. The digital data is read out using the second clock pulse and a blank signal is output during intervals when the PC output signals have been completely read out from the memory. In this way, the signal can be converted to a required signal standard, a format suitable for display on a selected display device. HDTVs which display video images are capable of displaying the vertical synchronizing signal of a PC signal input. Thus, the video signal converter of the present invention enables the display of a PC signal on an HDTV as a high picture quality.

DESCRIPTION OF THE PREFERRED EMBODIMENTS

First Exemplary Embodiment

Figure 1:
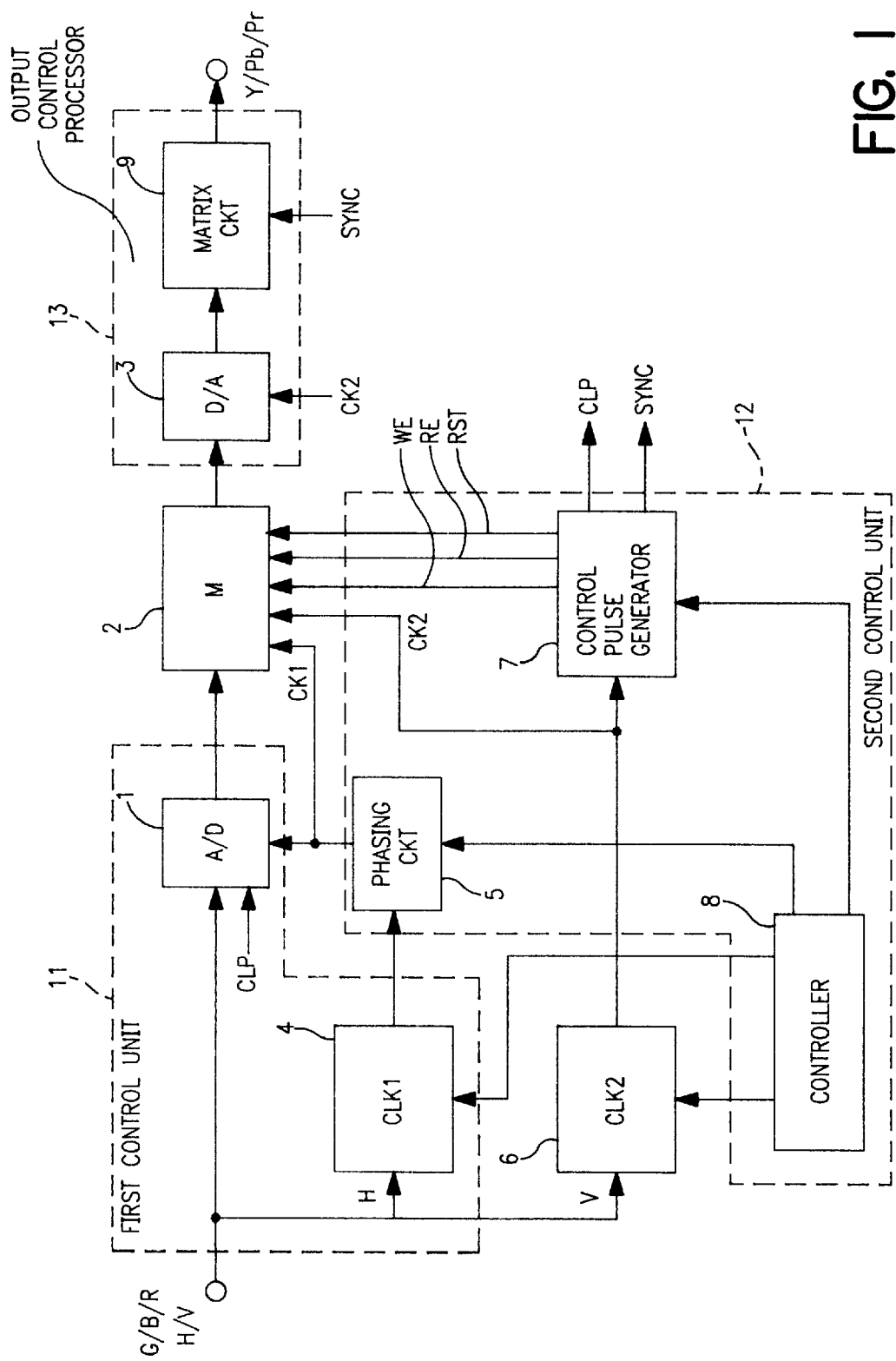
FIG. 1 is a block diagram of a video signal converter according to a first exemplary embodiment of the present invention.

A first exemplary embodiment of the present invention is described below with reference to FIG. 1. FIG. 1 is a block diagram of a video signal converter according to the first exemplary embodiment of the present invention. In FIG. 1, a first control unit 11 comprises an A/D (analog/digital) converter 1 and a first clock pulse generator (CLK1) 4.

The A/D converter 1 converts an analog input signal to a digital signal. Memory (M) 2 stores the digital signal output from the A/D converter 1. A first clock pulse generator (CLK1) 4 includes (1) a phase comparator, (2) a counter for counting clock pulses, and (3) an oscillator for changing a clock frequency according to the output of the phase comparator. The first clock pulse generator (CLK1) 4 produces a first clock pulse synchronized to the horizontal synchronizing signal of the input signal. A second clock pulse generator (CLK2) 6 includes (1) a phase comparator, (2) a counter for counting clock pulses, and (3) an oscillator for changing a clock frequency according to the output of the phase comparator. The second clock pulse generator (CLK2) 6 produces a second clock pulse synchronized to the vertical synchronizing signal of the input signal.

A second control unit 12 comprises a phasing circuit 5, a control pulse generator 7, and a controller 8. The phasing circuit 5 includes (1) an analog delay line and (2) a selector for selecting the output of the analog delay line. The phasing circuit 5 delays the input clock pulse according to given delay information. The control pulse generator 7 includes (1) a counter and (2) a ROM (read only memory). The control pulse generator 7 produces a signal WE for controlling the write period of the memory 2, a signal RE for controlling the readout period of the memory 2, a signal RST for initializing the memory 2, a clamp pulse CLP for clamping the input signal to A/D converter 1 in conversion, and a synchronizing signal SYNC.

The controller 8 transfers respective data to the first clock pulse generator 4, the phasing circuit 5, the second clock pulse generator 6, and the control pulse generator 7. The controller 8 comprises a microcomputer and a decoder for decoding the output of the microcomputer for transferring respective data to the first clock pulse generator 4, the phasing circuit 5, the second clock pulse generator 6, and the control pulse generator 7.

Also provided is an output control processor 13 which includes a D/A (digital/analog) converter 3 and a matrix circuit 9. The D/A converter 3 converts the digital signal output from the memory 2 to an analog signal. The matrix circuit 9 converts the input signal in the form of three primary colors G, B, and R to the luminance signal (Y) and two forms of chrominance signal: Pb and Pr as is known and described in *Television Engineering Handbook* by K. Blair and dated 1992, which is herein incorporated by reference. The converted signals are then output to a video display monitor (not shown) for displaying the input signal.

Figure 4A:
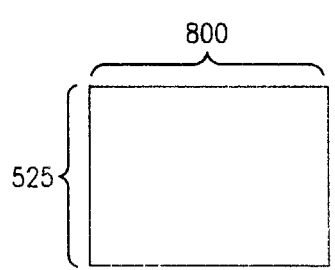
FIGS. 4a–4c are diagrams that illustrate a signal conversion method of the present invention.
Figure 4B:
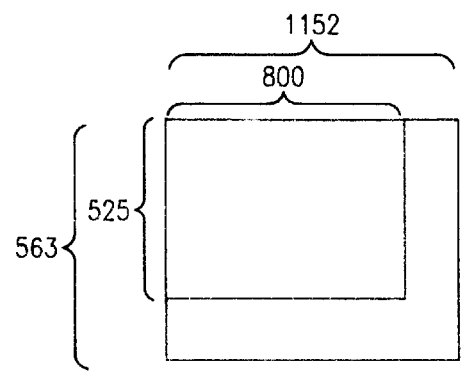
Figure 4C:
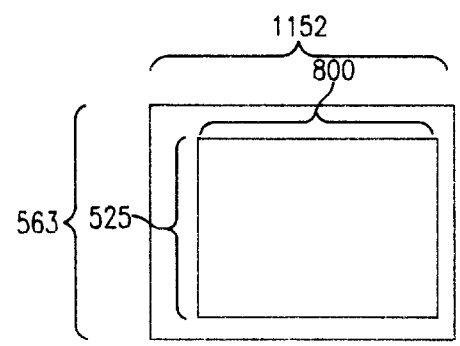
Figure 5:
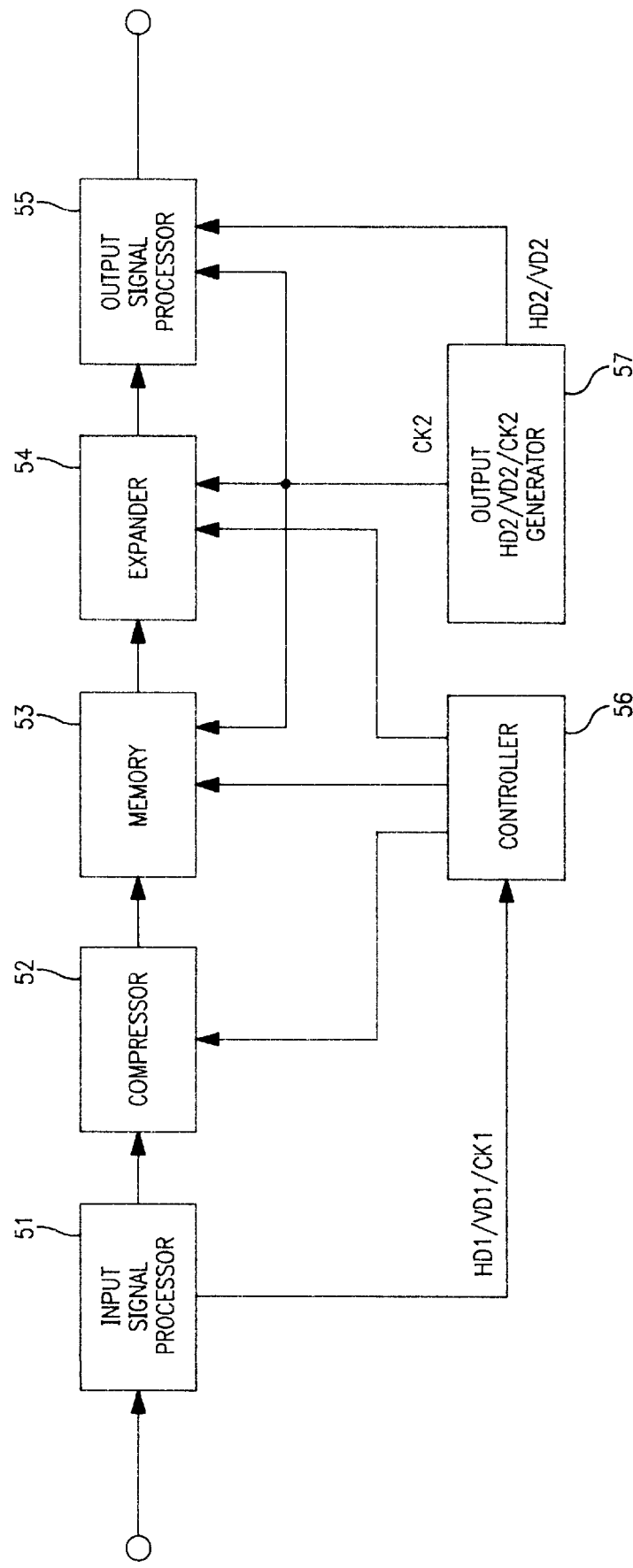
FIG. 5 is a block diagram of a video signal converter according to the prior art.

Before explaining the operation of the video signal converter illustrated in FIG. 1 as configured above, the input signal and desirable output signal are discussed below. The input signal is a PC output signal of, for example, a well-known typical VGA specification. The VGA specification consists of 800 horizontal pixels (dots) including the horizontal retrace line period, 525 vertical pixels (lines or dots) including the vertical retrace line period, and frame frequency of 60 Hz. The output signal of the video signal converter of the present invention is a signal which can be input and displayed on HDTVs employing, for example, the MUSE system whose specification is 1126 scanning lines, interlace scanning, frame frequency of 59.94 Hz, and aspect ratio of 9:16. Existing commercialized HDTVs can simply synchronize to a frame frequency of 60 Hz, and they can also display an input signal of 563 non-interlace scanning lines. Therefore, the output of the video signal converter of the present invention, which is an input signal for an HDTV, is targeted for the frame frequency of 60 Hz and 563 scanning lines. The present invention displays a VGA video image on an HDTV screen in unmodified form. FIGS. 4A–4C illustrate the concept of the invention.

The video signal from a PC as described above is converted to a video signal for display on an HDTVs as follows. Video data (800 horizontal pixels and 525 vertical lines of pixels) provided from the PC and written to a memory 2 in unmodified form. As is shown in FIGS. 4B and 4C, in the horizontal direction, a display of 1152 horizontal pixels is used, for example, in order to display an input video image with an aspect ratio of 3:4 on the 9:16 screen. On the screen, data of 800 pixels stored in the memory are sequentially read out and displayed. The remaining pixels of the display where there are no corresponding pixels stored in the memory, i.e., 1152−800=352 pixels, are left blank without displaying any video image. Further, as is shown in FIGS. 4B and 4C, in the vertical direction, the display has 563 scanning lines. On the screen, the video signal stored in the memory has 525 scanning lines which are sequentially read out and displayed on the display. The remaining scanning lines, i.e., 563−525=38 lines, are left blank. In other words, the VGA video image consisting of 800×525 pixels, shown in FIG. 4A, is displayed in a space of 800×525 pixels on the display screen of 1152×563 pixels, and the remaining pixel spaces are left blank.

Next, the operation of the video signal converter in FIG. 1 is described. The A/D converter 1 converts the G, B, and R input signals into digital signals using, for example, a clock frequency with a sampling frequency of 25.2 MHz. The first clock pulse generator 4 produces a clock pulse synchronized to the input signal. The phasing circuit 5 receives data for setting a desirable phase (delay information) from the controller 8, delays the output of the first clock pulse generator 4 according to the given delay information, and outputs a clock pulse CK1. The desirable phase is a phase of minimum phase distortion when sampling the input signal to the A/D converter. If the clock phase inappropriate, the A/D converter 1 will convert the analog signal to a digital signal in a distorted fashion, causing significant deterioration in picture quality. The phasing circuit 5 is thereby employed for setting an appropriate clock phase so that the input signal is converted to a digital signal without distortion.

The second clock pulse generator 6 produces a clock pulse CK2 synchronized to the vertical synchronizing signal of the input signal. The memory 2 records the output data of the A/D converter 1, synchronized with the clock pulse CK1 which is the output of the phasing circuit 5. The memory 2 outputs the data synchronized with the clock pulse CK2. In this way, the output signal is compressed or expanded signal and converted from the PC signal while retaining high picture quality. The conversion of the input signal is described below with reference to FIGS. 4A to 4C.

FIGS. 4A to 4C are illustrations of a signal conversion method of the present invention.

FIG. 4A illustrates a frame of the VGA specification which is the input signal. The frame includes 800 horizontal pixels by 525 vertical pixels. FIG. 4B is a case when the frame stored in memory 2 is read out at the top left position on the display. In other words, FIG. 4B demonstrates that the starting point for writing and reading out of the signal stored in memory 2 is the same as the starting point for writing and reading out for a frame of 1152 horizontal pixels by 563 vertical pixels.

FIG. 4C is a case when the frame stored in memory 2 is read out somewhat to the right from the left end and at a position somewhat lower than the top end on the display. In other words, the FIG. 4C demonstrates that the starting point for writing and reading of the signal stored in memory 2 is not the same as the starting point for writing and reading out of a frame of 1152 horizontal pixels by 563 vertical pixels. Put another way, the active image area, i.e., 800 horizontal pixels by 525 vertical pixels, of the signal is displayed and a blank signal is provided before, after, or around the active image area.

For example, supposing that 1152 pixels are to be written on the display, the selected clock frequency CK2 for reading out data from the memory is:

$$1/(1152 \times 563 \times 60) = 38.9 \text{ MHz}.$$

The control pulse generator 7 produces a write enable signal WE for controlling the write period of the memory 2, and a read enable signal RE for controlling the readout period of the memory 2, a reset signal RST for controlling the initialization of the memory 2, a clamp pulse, and a synchronizing signal. As described above, the input signal in FIG. 4A is sampled synchronized with a clock frequency CK1 (25.2 MHz), and recorded in the memory 2. The data recorded in the memory 2 is read out as if the signal had 1152 horizontal pixels and 563 vertical pixels as shown in FIG. 4B using a clock frequency CK2 (about 38.9 MHz) synchronized to the vertical synchronizing signal of the input signal. Writing and reading processes are synchronized to the same vertical synchronizing signal, and accordingly, their vertical frequencies are equivalent.

The input signal is stored in the memory in the form of 800 horizontal pixels. After reading out data of 800 horizontal pixels from the memory 2 as the output signal for one scan line, the readout from the memory 2 is temporary stopped, and the blank signal is output for the period of 352 (1152−800=352) pixels. The blank signal is also output for 38 (563−525=38) pixels in the vertical direction. In this way, the VGA signal which has an aspect ratio of 3:4 can be displayed, without sideways expansion, on HDTVs. Accordingly, the signal can be compressed in time scale and the image can be regenerated without any loss of picture quality. Moreover, if the frequency of CK2 is set below 25.2 MHz, the signal can be expanded in time scale. Furthermore, as shown in FIG. 4C, the position for displaying the output signal is changeable.

The display position of the output signal can be changed by changing the output phase of the write enable signal WE for controlling the write period of the memory 2, the read enable signal RE for controlling the readout period of the memory 2, the reset signal RST for controlling the initialization of the memory 2, the horizontal synchronizing signal HD, and the vertical synchronizing signal VD.

Returning to FIG. 1. the controller 8 transfers the data for setting the clock frequency to the first clock pulse generator 4, the data for setting the clock phase to the phasing circuit 5, the data for setting the clock frequency to the second clock pulse generator 6, and the data for setting the HD and VD phases to the control pulse generator 7. The controller 8 comprises but is not limited to a microcomputer and a decoder for decoding the output of the microcomputer. The D/A converter converts the output of the memory 2 to an analog signal and the matrix circuit 9 then converts the analog signal to the Y-, Pb-, and Pr- type signal.

Existing commercialized HDTVs are usually equipped with an input terminal for receiving an HDTV baseband signal. This input ternminal is designed for 1125 scanning lines and a 59.94 Hz vertical frequency (interlaced scanning) or 525 scanning lines and a 59.94 Hz vertical frequency (sequential scanning). If the PC signal of the VGA specification is input to this input terminal on the HDTV after simply converting the PC signal to Y-, Pb-, and Pr-type signals in matrix fashion, signals displayed will be distorted or invisible on the screen due to the aspect ratio of the HDTV and overscanning. A television set equipped with the video signal converter shown in FIG. 1 of the present invention can maintain the aspect ratio and ensure no missing images as a result of overscanning by processing signals as is shown in FIGS. 4A to 4C.

The output signal shown in FIGS. 4A and 4B have 563 scanning lines and a vertical frequency of 60 Hz (sequential scanning). Typically, according to the present invention, if this signal is input to the baseband signal input terminal of a commercial HDTV, the signal can be displayed on the HDTV without any problem. It should be understood, however, that the signal standard after conversion is not limited to 563 scanning lines and a vertical frequency of 60 Hz in the video signal converter of the present invention.

As explained above, the present invention enables the reproduction of high-quality video images by compressing the input signal in the horizontal and vertical directions under the control of clock pulses for writing and reading out data from the memory, compared to digital signal processors which employ a digital filter operated with a single clock pulse for compression in time scale. Moreover, conversion of the vertical frequency is not necessary for the present invention because the second clock frequency CK2 is synchronized to the vertical synchronizing signal of the input signal. Specifically, there is no need for processing in time scale, such as conversion from 60 Hz to 59.94 Hz. This avoids damage to the picture quality by interpolation or missing images.

By inputting the output of the video signal converter of the present invention to the baseband input terminal of a typical HDTV, high picture-quality VGA signals can be displayed. Thus, the present invention offers an interface which can easily connect PCs to HDTVs and assures high picture quality.

Second Exemplary Embodiment

Figure 2:
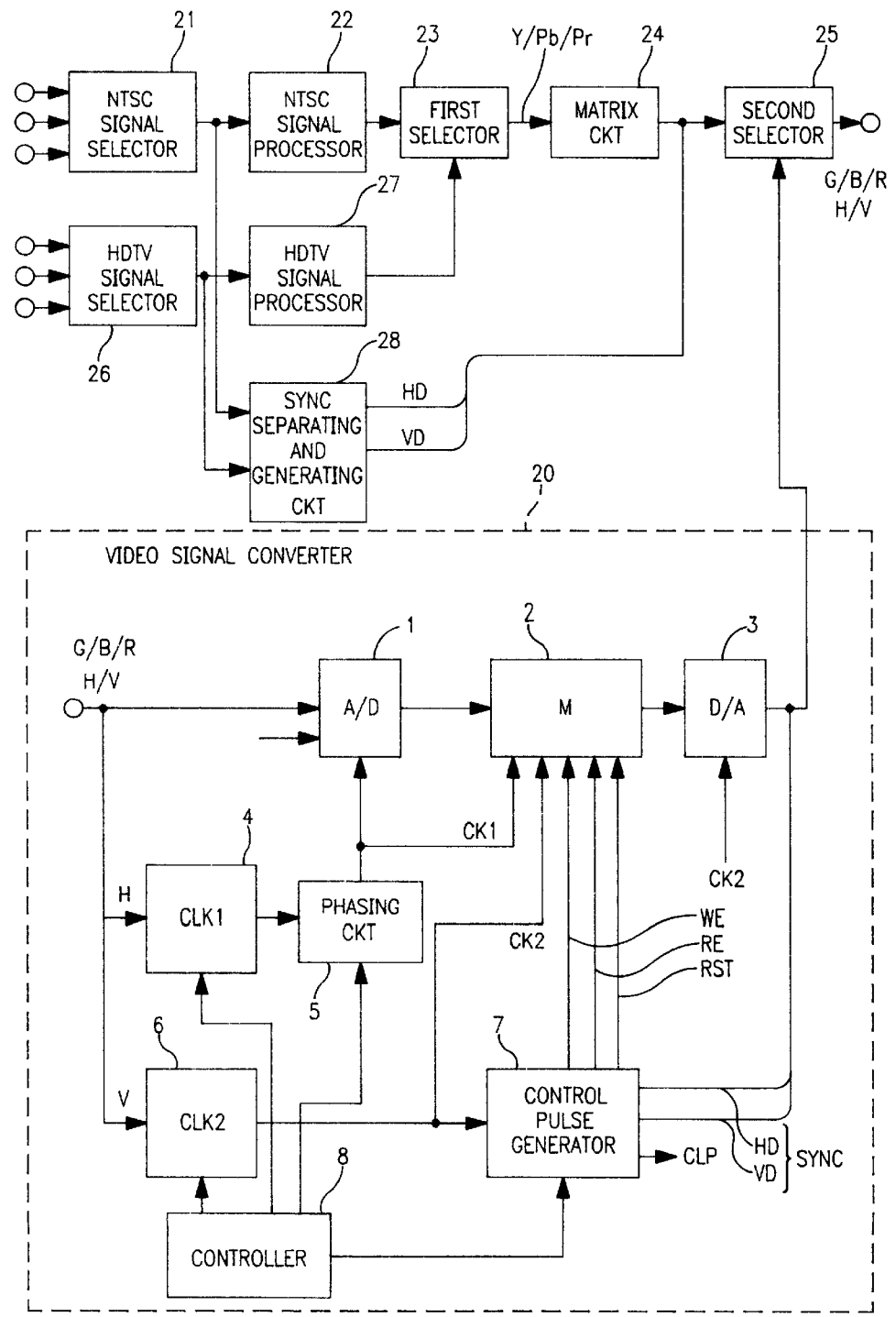
FIG. 2 is a block diagram of a television signal processing apparatus according to a second exemplary embodiment of the present invention.

The second exemplary embodiment of the present invention is a television signal processing apparatus employing a video signal converter explained in the first exemplary embodiment. FIG. 2 is a block diagram of the second exemplary embodiment. The same numbers are given to circuit blocks of the video signal converter in the television signal processing apparatus which have the same functions and operations as those of the circuit blocks explained in the first exemplary embodiment. Therefore, the functions and operations are briefly explained to avoid redundancy. A video signal converter 20 surrounded by a broken line is described below with reference to FIG. 2.

Input signals of the video signal converter are PC output signals of G/B/R/H/V signals; for example, well-known typical VGA specification which consists of 800 horizontal pixels including the horizontal retrace line period, 525 vertical pixels including vertical retrace line period, and frame frequency of 60 Hz. The output signal of the video signal converter of the present invention has, for example, a frame frequency of 60 Hz, 1152 horizontal pixels including the horizontal retrace line period, and 563 vertical pixels including the vertical retrace line period.

The A/D converter 1 converts the analog input signal to the digital signal, and the memory 2 stores the digital signal output from the A/D converter 1. The first clock pulse generator 4 produces a first clock pulse synchronized to the horizontal synchronizing signal of the input signal. The first clock pulse generator 4 includes (1) a phase comparator, (2) a counter which counts the clock pulse, and (3) an oscillator which changes the clock frequency according to the output of the phase comparator. The phasing circuit 5 delays the input clock pulse according to given delay information. The phasing circuit 5 includes an analog delay line and a selector for selecting the output of the analog delay line. The D/A converter 3 converts the digital signal output from the memory 2 to the analog signal.

The second clock pulse generator 6 produces a second clock pulse synchronized to the vertical synchronizing signal of the input signal. The second clock pulse generator 6 comprises (1) a phase comparator, (2) a counter for counting clock pulses, and (3) an oscillator for changing a clock frequency according to the output of the phase comparator. The control pulse generator 7 produces a signal WE for controlling the write period of the memory 2, a signal RE for controlling the readout period of the memory 2, a signal RST for controlling the initialization of the memory 2, a clamp pulse CLP, and a synchronizing signal. The control pulse generator 7 comprises a counter and ROM. The controller 8 transfers respective data to the first clock pulse generator 4, phasing circuit 5, second clock pulse generator 6, and control pulse generator 7. The controller 8 includes a microcomputer and a decoder for transferring respective data to the first clock pulse generator 4, phasing circuit 5, second clock pulse generator 6, and control pulse generator 7.

An NTSC signal selector 21 selects one NTSC composite signal from multiple NTSC composite signals, and provides the selected signal to a NTSC signal processor 22. The NTSC signal processor 22 separates the color signal using an NTSC-HDTV converter, decodes the color signal, and converts the signal to Y-, Pb-, and Pr-form HDTV signals which can be displayed on an HDTV.

An HDTV signal selector 26 selects one HDTV signal from multiple HDTV signals; for example, an HDTV signal of the MUSE system. An HDTV signal processor 27 decodes and converts the selected signal, for example, a MUSE signal to Y-, Pb-, and Pr-form HDTV signals. A first selector 23 selects either the output of the NTSC signal processor 22 or the HDTV signal processor 27. A matrix circuit 24 receives the Y, Pb, and Pr signals, and converts them to G, B, and R signals.

A sync separating and generating circuit 28 separates the synchronizing signal from the input signal. A second selector 25 receives the output of the sync separating and generating circuit 28, which include the horizontal synchronizing signal HD and vertical synchronizing signal VD, together with the output signal of the matrix circuit 24. For the NTSC signal, the horizontal synchronizing signal HD and vertical synchronizing signal VD are produced and output so that the NTSC signal can be displayed on an HDTV. The second selector 25 selects either the output of the matrix circuit 24 or the output signal of the video signal converter 20; that is a compressed or expanded signal converted from the PC output signal which retains high picture quality.

The television video signal processing apparatus of the second exemplary embodiment thus enables the display of a high picture quality VGA signal by employing a built-in video signal converter.

Furthermore, the television video signal processing apparatus of the second exemplary embodiment allows the reduction in the scale of the circuit as compared to the external video signal converter because it does not require a matrix circuit for converting the output of the D/A converter 3.

Third Exemplary Embodiment

Figure 3:
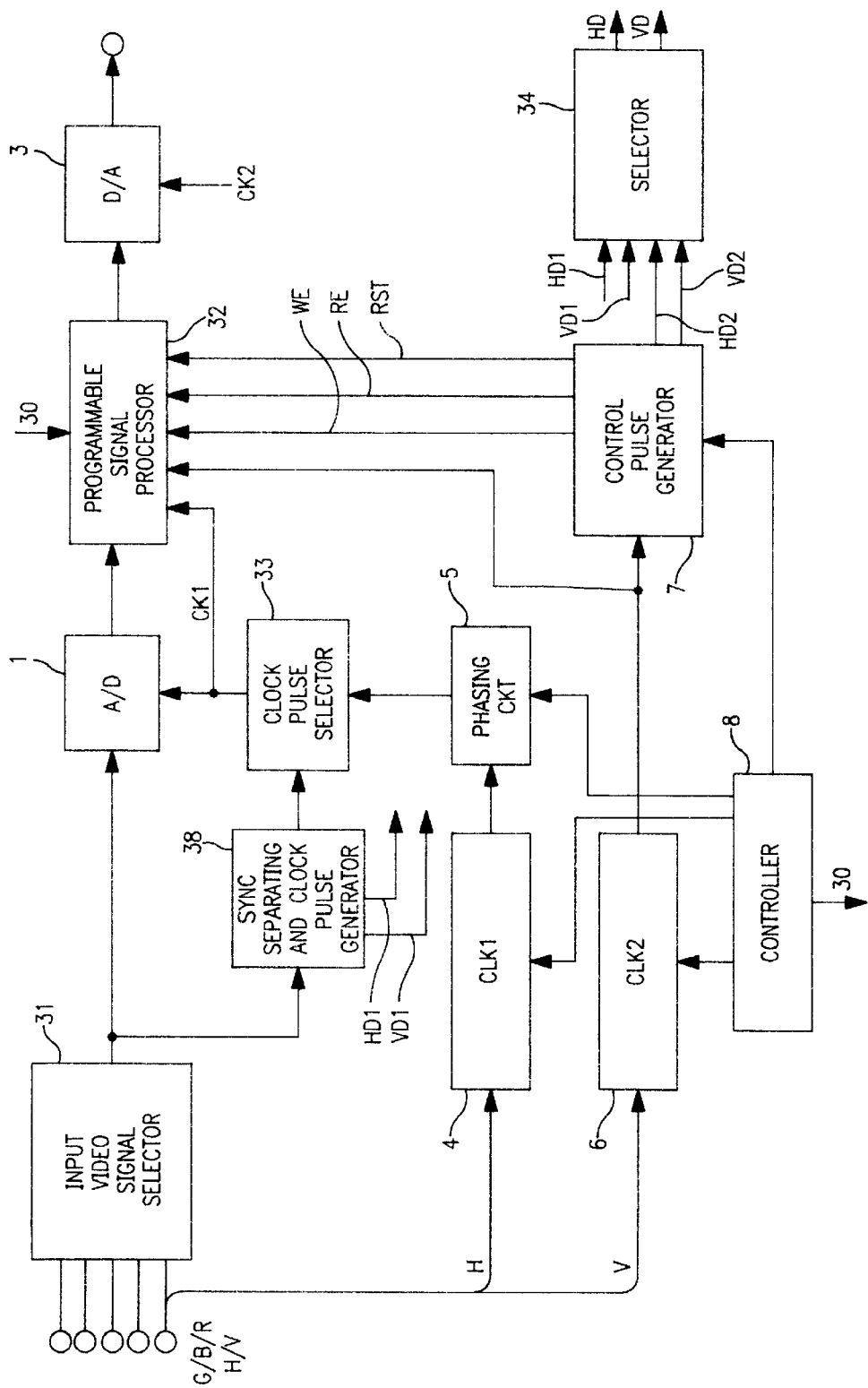
FIG. 3 is a block diagram of a television signal processing apparatus according to a third exemplary embodiment of the present invention.

FIG. 3 is a block diagram of a third exemplary embodiment of the present invention. In FIG. 3, an A/D converter 1 converts the analog input signal to a digital signal. A first clock pulse generator 4 produces a clock pulse synchronized to the input signal. The first clock pulse generator 4 comprises a phase comparator, a counter for counting the clock pulse, and an oscillator for changing a clock frequency according to the output of the phase comparator. A sync separating and clock pulse generating circuit 38 separates the synchronizing signal from the input signal and produces a clock pulse synchronized to the input signal. A phasing circuit 5 delays the input clock pulse according to given delay information. The phasing circuit 5 comprises an analog delay line and a selector for selecting the output of the analog delay line. A clock pulse selector 33 selects the input clock signal.

An D/A converter 3 converts the digital signal output from a programmable signal processor 32 to the analog signal. A second clock pulse generator 6 produces a second clock pulse synchronized to the vertical synchronizing signal of the input signal. The second clock pulse generator 6 includes a phase comparator, a counter for counting clock pulses, and an oscillator for changing a clock frequency according to the output of the phase comparator. A control pulse generator 7 produces a signal WE for controlling the write period, a signal RE for controlling the memory readout period, a signal RST for controlling the initialization of the memory, a clamp pulse, and a synchronizing signal. The control pulse generator comprises a counter and ROM.

A controller 8 transfers respective data to the first clock pulse generator 4, phasing circuit 5, second clock pulse generator 6, and control pulse generator 7. The controller 8 comprises a microcomputer and a decoder for decoding the output of the microcomputer for transferring respective data to the first clock pulse generator 4, phasing circuit 5, second clock pulse generator 6, and control pulse generator 7.

An input video signal selector 31 selects a signal to decode from multiple NTSC signals or HDTV signals. The programmable signal processor 32 changes the contents of decoding process based on control data 30 received from the controller 8 and conducts appropriate decoding on the input signal so as to output the signal in a required form. The programmable signal processor 32 comprises (1) a memory for recording the digital signal which is the output of the A/D converter 1, synchronized with the first clock pulse, and reading out the digital signal, synchronized with the second clock pulse, (2) a ROM for storing a program for decoding multiple forms of signals such as NTSC, MUSE, and VGA, and (3) a digital signal processor (hereafter referred to as DSP) for loading the required program from the ROM in response to the input signal and then conducting the decoding process.

The DSP, in general, comprises a ROM for storing programs, a memory for provisionally storing the input signal or the signal undergoing decoding, and a processor for reading out a program from the ROM and conducting operations on multiple data according to the program. The operation of the television signal processing apparatus in FIG. 3 as configured above is described below. In the description of the present invention, the input signal is the PC output signal, generally called VGA, which has 800 horizontal pixels including the horizontal retrace line period and 525 vertical pixels including the vertical retrace line period. The output of the video signal converter of the present invention has 1152 horizontal pixels including the horizontal retrace line period and 563 vertical pixels including the vertical retrace line period. The same numbers are given to the circuits which operate in the same manner as those in the first exemplary embodiment, and thereby the explanation is omitted.

The input signal selector 31 selects a signal to be converted from multiple NTSC signals or HDTV signals. The sync separating and clock pulse generating circuit 38 conducts synchronizing separation on the output of the input signal selector 31, and regenerates the horizontal synchronizing signal (HD1) and vertical synchronizing signal (VD1). The sync separating and clock pulse generating circuit 38 also produces a clock pulse for sampling by the A/D converter 1. The clock pulse selector 33 selects a clock pulse output from the sync separating and clock pulse generating 38 when the output of the input video signal selector 31 is other than the PC output. When the output of the input video signal selector 31 is a PC signal, the clock pulse selector 33 selects and outputs the clock pulse output from the phasing circuit 5. The A/D converter 1 converts the output signal of the input video signal selector 31 to a digital signal using the clock pulse output from the clock pulse selector 33.

The programmable signal processor 32 implements a process according to the control data 30 received from the controller 8, conducts appropriate decoding of the input signal, and outputs the signal in the required form. For decoding the NTSC signal, for example, the programmable signal processor 32 first records the digital signal which is the output of the A/D converter 1, synchronized with the first clock pulse. Then, the program for decoding the NTSC signal is loaded to the DSP. The DSP operates according to the loaded program, conducts processes including 3-dimensional YC separation, color demodulation, double-speed scanning conversion, and matrix conversion, and outputs a decoded signal. For decoding the VGA signal, for example, the programmable signal processor 32 records the digital signal which is the output of the A/D converter, synchronized with the first clock pulse, and reads out the digital signal, synchronized with the second clock pulse. Then, the DSP loads the program for processing the VGA signal from the ROM and conducts processes such as picture quality compensation. A selector 34 selects and outputs the horizontal synchronizing signal HD1 and vertical synchronizing signal VD1 for the NTSC signal or the HDTV signal, and the horizontal synchronizing signal HD2 and vertical synchronizing signal VD2 for the PC signal. It should be understood, however, that the programmable signal processor 32 of the present invention is not limited to the configuration described above.

The above configuration allows HDTVs to display high picture quality VGA signals. Compared to the television signal processing apparatus explained in the second exemplary embodiment, the third exemplary embodiment enables the decoding of signals such as NTSC, MUSE and VGA signals using a shared circuit, resulting in a reduction of circuit size. In addition, the picture quality of the VGA signal can be easily compensated without increasing the scale of the circuit.

The present invention thus converts video signals to a signal in a required form by converting the input signal to a digital signal using the first clock pulse synchronized to the horizontal synchronizing signal of the input signal, recording the digital signal to the memory, reading out the signal from the memory using the second clock pulse synchronized to the vertical synchronizing signal of the input signal, and reconverting it to an analog signal. With this configuration, the present invention enables the easy display of PC output signals on HDTVs with high picture quality without causing deterioration in picture quality by interpolation or missing images.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A television signal processing apparatus comprising:
   a NTSC signal processor for decoding an NTSC signal and producing a first decoded signal;
   a HDTV signal processor for decoding a HDTV signal and producing a second decoded signal;
   a first selector for selecting one of the first decoded signal and the second decoded signal to produce a selected signal;
   a matrix circuit for converting the selected signal to produce a matrix signal;
   a sync separating and clock pulse generating circuit for separating a synchronizing signal from the first decoded signal and the second decoded signal and producing a clock pulse used by said NTSC signal processor and said HDTV signal processor;
   a video signal converter for converting an analog input signal having a horizontal synchronizing signal and a vertical synchronizing signal comprising:
      (a) an input signal processor including:
         (1) a first clock pulse generator for producing a first clock pulse synchronized to the horizontal synchronizing signal of the analog input signal, and
         (2) means for converting said analog input signal to a digital signal using said first clock pulse;
      (b) a second clock pulse generator for producing a second clock pulse synchronized to the vertical synchronizing signal;

(c) a memory for recording said digital signal synchronized with said first clock pulse;

(d) a controller for outputting data that determines said first clock pulse and said second clock pulse to control write and readout positions of said memory; and (e) an output signal processor for outputting the digital signal from said memory using said second clock pulse based on the data from said controller, and converting said digital signal to an analog signal to produce a converter signal; and a second selector for selecting one of the matrix signal and the converter signal.

2. A television signal processing apparatus comprising:

an input signal selector for selecting an analog input signal to produce a selected signal having a first horizontal synchronizing signal and a first vertical synchronizing signal;

a sync separating and clock generating circuit for separating the first vertical synchronizing signal and the first horizontal synchronizing signal from the selected signal and regenerating a clock pulse;

a first clock pulse generator for producing a clock pulse synchronized to the first horizontal synchronizing signal;

a phasing circuit for adjusting the output phase of said first clock pulse generator and producing a first clock;

a clock pulse selector for selecting one of the clock pulse and the first clock pulse;

an A/D converter for converting the analog input signal sampled using the output of said clock pulse selector to the digital signal;

a second clock pulse generator for producing a clock pulse synchronized to the first vertical synchronizing signal of said input signal;

a programmable signal processor for conducting different decoding processes on the output of said A/D converter depending on the form of the input signal;

a D/A converter for converting the output of said programmable signal processor to the analog signal;

a control pulse generator for producing a second vertical synchronizing signal and a second horizontal synchronizing signal;

a selector for selecting one of (1) the first horizontal synchronizing signal and the first vertical synchronizing signal and (2) the second horizontal synchronizing signal and the vertical synchronizing signal; and a controller for outputting data for determining a clock frequency of said first clock pulse generator and said second clock pulse generator, and a signal for specifying a reference position for said control pulse generator.

3. A television signal processing apparatus as defined in claim 2, wherein said programmable signal processor comprises:

a memory for recording said digital signal synchronized with the first clock pulse, and reading out said digital signal synchronized with said second clock pulse and a digital signal processor for performing the different decoding processing operations by using different programs.

* * * * *